(12) United States Patent
Nho et al.

(10) Patent No.: US 7,153,485 B2
(45) Date of Patent: Dec. 26, 2006

(54) METHOD FOR PREPARING SINGLE CRYSTALLINE ZINC SULFIDE POWDER FOR PHOSPHOR

(75) Inventors: Jun-Seok Nho, Taejeon (KR);
Seung-Beom Cho, Taejeon (KR);
Chang-Seok Ryoo, Taejeon (KR);
Kwang-Hee Lee, Seoul (KR);
Tae-Hyun Kwon, Taejeon (KR)

(73) Assignee: LG Chem, Ltd. (KR)

( * ) Notice: Subject to any disclaimer, the term of this patent is extended or adjusted under 35 U.S.C. 154(b) by 548 days.

(21) Appl. No.: 10/380,144

(22) PCT Filed: May 7, 2002

(86) PCT No.: PCT/KR02/00842

§ 371 (c)(1),
(2), (4) Date: Mar. 10, 2003

(87) PCT Pub. No.: WO02/090262

PCT Pub. Date: Nov. 14, 2002

(65) Prior Publication Data

US 2003/0172868 A1 Sep. 18, 2003

(30) Foreign Application Priority Data

May 8, 2001 (KR) .................................. 2001-0024985

(51) Int. Cl.
*C01G 9/08* (2006.01)
*C09K 11/56*

(52) U.S. Cl. ................................. 423/566.1; 252/301.6
(58) Field of Classification Search .............. 423/566.1; 252/301.6 S
See application file for complete search history.

(56) References Cited

U.S. PATENT DOCUMENTS

| 5,908,608 A | * | 6/1999 | Lawandy et al. ............ 423/509 |
| 6,153,123 A | * | 11/2000 | Hampden-Smith et al. .......... 252/301.4 S |
| 6,193,908 B1 | * | 2/2001 | Hampden-Smith et al. .......... 252/301.4 R |
| 2004/0262577 A1 | * | 12/2004 | Urabe et al. .......... 252/301.6 S |

FOREIGN PATENT DOCUMENTS

| CN | 1245823 A | | 3/2000 |
| EP | 0 078 538 | * | 5/1983 |
| JP | 53064693 | | 6/1978 |
| JP | 58-115024 | | 8/1983 |
| JP | 4-16512 | | 1/1992 |
| JP | 5-178616 | | 7/1993 |
| JP | 2000-143245 | | 5/2000 |

OTHER PUBLICATIONS

L.P. Wang et al., "A new preparation of zinc sulfide nanoparticles by solid–state method at low temperatures", Mat. Res. Bull., 2000, vol. 35, pp. 695–701.*
J. Zhu et al., "Preparation of CdS and ZnS nanoparticles using microwave irradiation", Materials Letters, vol. 47, pp. 25–29, Jan. 2001.*
C. Feldmann et al., "Polyol mediated synthesis of nanoscale MS particles (M = Zn, Cd, Hg)", J. Mater. Chem., 2001, vol. 11, pp. 2603–2606 (published on the web Aug. 21, 2001).*
R. A. Laudise et al., "Hydrothermal Synthesis of Zinc Oxide and Zinc Sulfide", J. Phys. Chem., 1960, vol. 64, Issue 5, pp. 688–691.*
Derwent abstract accession No. 1973–31077U, for SU 352842 A, published at least as early as 1973.*
Derwent abstract accession No. 1975–50475W, for SU 446302 A, published Dec. 1974.*
B. G. Wang et al., "On the Morphological Changes and Twinning of ZnS (Sphalertite) Crystallites under Hydrothermal Conditions", Cryst. Res. Technol., 2000, vol. 35, Issue 3, pp. 279–289.*
Deborah Murphy Wilhelmy, Egon Matijevic, Preparation and Properties of Monodispersed Spherical–colloidal Particles of Zinc Sulfide, J. Chem. Soc., Faraday Trans. 1(80), 563–570 (1984).
Mufit Akinc, Ahmet Celikkaya, Synthesis of Polycrystalline ZnS Particles, Ceramic Trans. 12, 137–146 (1990).
Ahmet Celikkaya, Mufit Akine, Preparation and Characterization of Colloidal ZnS Particles, Mat. Res. Soc. Synn. Proc., 155, 31–36, (1989).
Richard Williams, P.N. Yocom, F.S. Stofko, Preparation and Properties of Spherical Zinc Sulfide Particles, J. Colloid Interface Sci., 106, 388 (1985).
Curtis E. Johnson, Deborah K. Hickey, Daniel C. Harris, Synthesis of metal sulfide powders from organometallics, SPIE/Infrared and Optical Transmitting Materials, 683 (1986).
Qian Yital, Su Yi, Xie Yi, Chen Qianwang, Chen Zuyao, Yang Yi, Hydrothermal Prepartion and Characterization of Nanocrystalline powder of Sphalerite, Mat. Res. Bull., 30(5), 601–605 (1995).
Qianwang Chen, Y.T. Qian, Z. Y. Chen, L. Shi, X.G.Li, G.E. Zhou, Y.H. Zhang, Preparation of Zinc Sulfide thin films by the hydrothermal method, Thin Solid Films, 272, 1–3 (1996).
International Search Report; PCT/KR02/00842; Aug. 30, 2002.
A Communication From a China Patent Office in a Counterpart Foreign Application dated Sep. 17, 2004.

* cited by examiner

*Primary Examiner*—Stanley S. Silverman
*Assistant Examiner*—Ardith E. Hertzog
(74) *Attorney, Agent, or Firm*—Cantor Colburn LLP

(57) ABSTRACT

This invention relates to a method for preparing a Zinc Sulfide powder, and provides a method for preparing a single crystalline powder of Zinc Sulfide (ZnS) a high crystallinity comprising a step of conducting a hydrothermal reaction of a) Zinc Oxide or Zinc acetate as Zinc source and b) thioacetamide or thiourea as Sulfur source at a temperature of 180 to 230° C. and a fluorescent substance using the same as a source.

7 Claims, 15 Drawing Sheets

METHOD FOR PREPARING SINGLE CRYSTALLINE ZINC SULFIDE POWDER FOR PHOSPHOR

BACKGROUND OF THE INVENTION (a) Field of the Invention

This invention relates to a method for preparing Zinc Sulfide powder, particularly to a method for preparing a single crystalline Zinc Sulfide powder and to a Zinc Sulfide based fluorescent substance using a Zinc Sulfide produced by the same method as a source.

(b) Description of the Related Art

Recently, a research for synthetic of a ceramic powder and interests of their commercial applications has been increased. The factor has been recognized a reason why the conventional method that powder has prepared by milling a mineral has a critical point which can not be obtain a ceramic having superior properties.

The Powder synthesis method by liquid such as the coprecipitation method, the sol-gel method, and the hydrothermal synthesis method has been actively studied because the method complements the conventional deficiency, develops new potentially and enables to get high value added ceramic products.

Especially, the hydrothermal synthesis method has been lively studied and used commercially because the method includes controlling particle size and shape, one of merits of liquid-powder synthesis method and moreover it enables to grow single crystalline particle at the situation of much lower temperature than solid reaction and controlling particle size and shape.

A powder synthesis method by liquid such as hydrothermal synthesis method is build-up, which is a kind of growth method from minute core to particle, and therefore it facilitates the composition of minute particles, meanwhile it has difficulty in composing high crystalline particles. Many studies, to overcome these problems, has tried to grow the particles after limiting the sizes of the first particles and apply them to reaction at high temperature and pressure of the supercritical point of water and has used high concentration of acid or ammonium to facilitate the solubility.

A powder synthesis process by liquid type is generally conducted by the two steps of core formation and growth of crystal. These two steps are necessary to control the size of the particles. However, at the stage of core formation, the more the cores are, the smaller sizes of the cores become and therefore secondary seed formation occurs and it is hard to make even and large particles in case that when the crystal grows the supersaturation is high or energy barrier of growth to larger particles is lower than core formation. The supersaturation of reactant liquid should be controlled properly to make the particles big and even. It is very important to control proper solvent, density of solute, temperature and solubility and choose additives for controlling the form of the particles in order to compose synthesizing a ceramic powder because the supersaturation can be controlled by mainly the concentration of solute and the solubility of solution.

Meanwhile, Zinc Sulfide (ZnS) powder, which is multifunctioning ceramic powder applied to a pigment, an infrared apparatus and a water purifier apparatus, has been studied actively especially in the field of fluorescent substance and widely used for fluorescent material of TV cathode-ray-tube.

In many fields using Zinc Sulfide (ZnS) powder, the particle size of the powder and controlling of the form is very much needed but there are many difficulties in using of Zinc Sulfide (ZnS) because there is no other method than solid synthesis method at a high temperature having difficulty in controlling properties and there's no study result regarding the composition of Zinc Sulfide (ZnS) powder by various kind of a solution method such as a coprecipitation method, a hydrothermal synthesis method, an emulsion method.

In relation to the conventional technique regarding the composition of Zinc Sulfide powder by liquid type, the following has been reported: it is possible to get spherical Zinc Sulfide particles in case of aging by keeping it 60° C. after precipitating a Zinc Sulfide seed particle from water solution of zinc nitrate, nitric acid and thioacetamide (Deborah Murphy Wilhelmy, Egon Matijevic, Preparation and Properties of Monodispersed Spherical-colloidal Particles of Zinc Sulfide, J.Chem.Soc., Faraday Trans. 1(80), 563–570 (1984)).

And, an example has been reported that the Zinc Sulfide has been precipitated in presence of a variable negative ion using a variable zinc salt and thioacetamide as sources. Herein the reaction temperature is established from 60 to 70 □, and when the Zinc Sulfide particle is synthesized in presence of each nitrate ion, sulfate ion, or acetate ion, the particle size of first particle is about 13 nm, and the particle size of second particle is multiple crystals (Mufit Akinc, Ahmet Celikkaya, Synthesis of Polycrystalline ZnS Particles, *Ceramic Trans*12, 137–146, (1990), Ahmet Celikkaya, Mufit Akinc, Preparation and Characterization of Colloidal ZnS Particles, *Mat. Res. Soc. Symp. Proc.*, 155, 31–36 (1989)).

Also, there is an example that a Zinc Sulfide is synthesized by after solving zinc oxide with sulfuric acid, reacting with thioacetamide at a temperature of about 80 □. Wherein the analysis result of the produced powder according to reaction time shows that the early reaction produce a crystalline powder of 1 μm, and the powder is gradually changed to spherical particle having a particle size of about 2 to 5 μm by wrapping a fiber (Richard Williams, P. N. Yocom, F. S. Stofko, Preparation and Properties of Spherical Zinc Sulfide Particles, *J. Colloid Interface Sci.*, 106, 388 (1985)).

Additionally a study has been reported that Zinc Sulfide is synthesized from an organometallics. Herein the Zinc Sulfide is synthesized in toluene by using diethylzinc and sulfuric hydrogen as a main source. The produced powder is a spherical Zinc Sulfide particle having a particle size of 0.1 um that a small particle having a particle size of about 5 nm is aggregated (Curtis E. Johnson, Deborah K. Hickey, Daniel C. Harris, Synthesis of metal sulfide powders from organometallics, *SPIE/Infrared and Optical Transmitting Materials*, 683 (1986)).

A study using hydrothermal synthesis method has been reported in addition to the example prepared by precipitation method using a low temperature. Herein Zinc Sulfide (ZnS) powder is synthesized by hydrothermal reaction at a temperature of 150 □ using zinc acetate and sodium sulfide (Na$_2$S). It is reported that the synthetic powder obtained after reacting for about 10 hours is a very small sized particle which the average particle size is 6 nm (Qian Yitai, Su Yi, Xie Yi, Chen Qianwang, Chen Zuyao, Yang Y, Hydrothermal Preparation and Characterization of Nanocrystalline powder of Sphalerite, *Mat. Res. Bull.*, 30(5), 601–605 (1995)).

Meanwhile, a study has been reported that Zinc Sulfide based thin film is prepared by using the reactant source which used in the research of hydrothermal reaction and 4 N nitric acid solution for controlling pH (Qianwang Chen, Y. T. Qian, Z. Y. Chen, L. Shi, X. G. Li, G. E. Zhou, Y. H. Zhang, Preparation of Zinc Sulfide thin films by the hydrothermal method, *Thin Solid Films*, 272, 1–3 (1996)).

On the other hand, Braun tube applied to TV and monitor has a high precision more and more, accordingly fluorescent substance having a small size is demanded for them, and the conventional Zinc Sulfide is prepared by using a mechanical milling for obtaining a fluorescent substance having 5 μm below of particle size.

SUMMARY OF THE INVENTION

Accordingly, it is an object of the present invention to provide a method for preparing a single crystalline Zinc Sulfide powder having homogenous fineness particle sizes and controlled shape.

It is another object of the present invention to provide a Zinc Sulfide based fluorescent substance having controlled particle sizes and shape produced by using a single crystalline Zinc Sulfide powder produced by the same method as a source.

In order to achieve these objects, the present invention provides a method for preparing a single crystalline powder of Zinc Sulfide (ZnS) having a high crystallinity comprising a step of conducting a hydrothermal reaction of a) Zinc Oxide or Zinc acetate as Zinc source and b) thioacetamide or thiourea as Sulfur source at a temperature of 180 to 230° C.

The hydrothermal reaction can be conducted by adding the first additive selected from a group of sulfuric acid, nitric acid and acetic acid, or the first additive and the second additive selected from a group of sodium chloride and sodium iodide.

And, the present invention provides a Zinc Sulfide based fluorescent substance produced by using a single crystalline Zinc Sulfide powder produced by the same method as a source.

Figure 1:
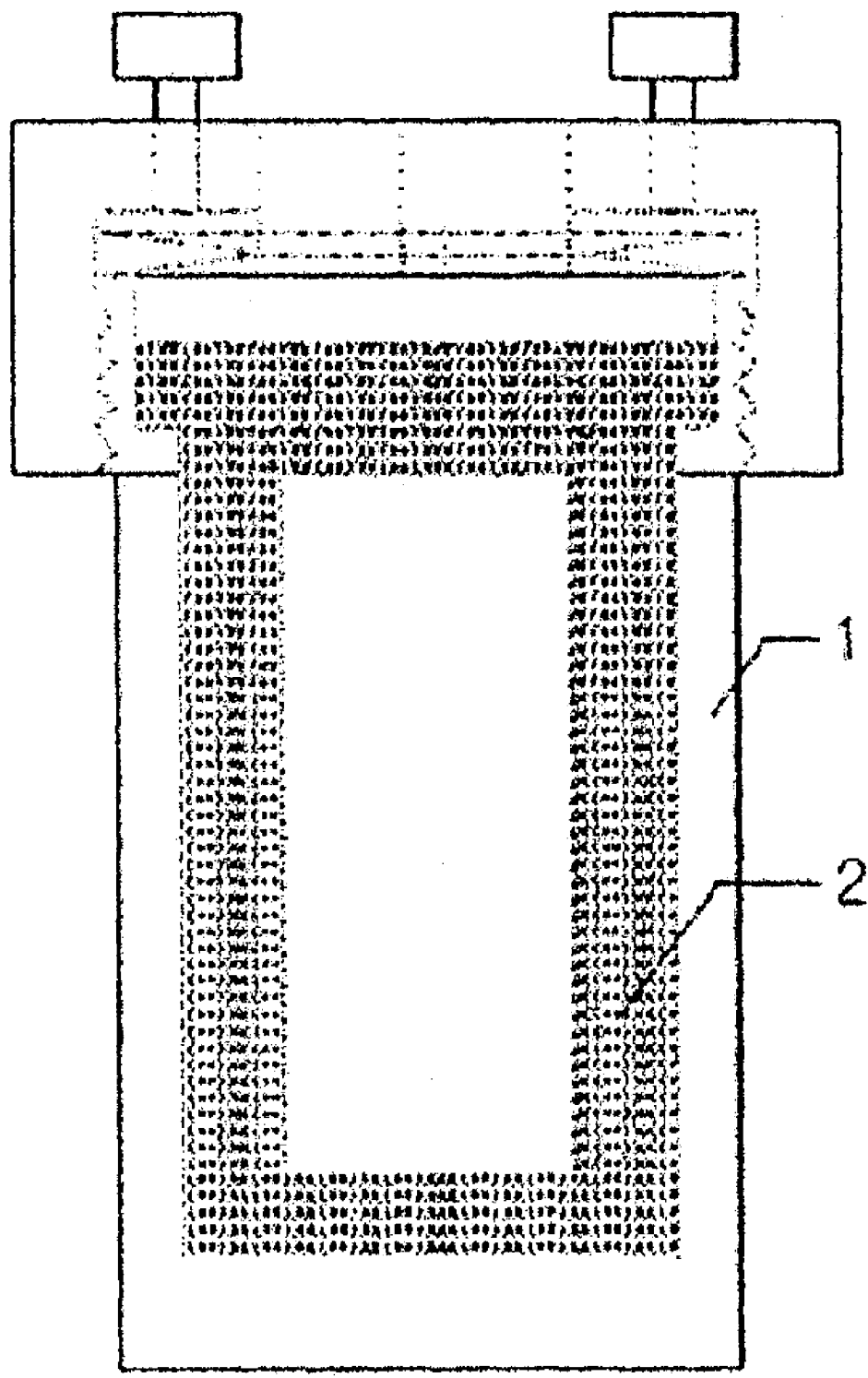
FIG. 1 is an approximate figure of autoclave used in Examples.

1 is a reaction bomb made of stainless steel, and 2 is a Teflon liner.

DETAILED DESCRIPTION OF THE PREFERRED EMBODIMENTS

This invention will be explained in detail as below.

This invention makes use of a hydrothermal reaction that can produce a crystalline ceramic powder directly and can easily control a shape of the produced powder, particularly provides a method for preparing a Zinc Sulfide powder by hydrothermal reacting a zinc source, a sulfur source, and additives as occasion demand in high-pressure reactor and controlling the particle size and the shape.

According to the present invention, in order to obtain single crystalline powder of Zinc Sulfide (ZnS) having a high crystallinity, followings are considered: i) to select zinc (Zn) and sulfur (S) sources suitable for synthesizing ZnS, ii) to control a solubility of solution by adjusting a concentration of materials and an additive, and iii) to control a nucleogenesis and a crystal growth of the particulate.

According to the present intention, Zn source and S source are subjected to the hydrothermal reaction at 180–230 □ to provide single crystalline powder of ZnS. When the temperature is less than 180 □, the crystal is hard to be grown, while when more than 230 □, the crystal could be shrunk, instead.

The ZnS is synthesized in the solution according to the reaction represented by the following Formula 1:

[Formula 1]

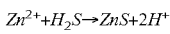
$$Zn^{2+} + H_2S \rightarrow ZnS + 2H^+$$

Accordingly, sources of $Zn^{2+}$ and $H_2S$ are appropriately selected to carry out the reaction. Firstly, it is carefully considered to select a source of $Zn^{2+}$, since the anionic material significantly affects on a composition of reacting solution. Further, the material should be selected by considering a specific solubility under the certain reaction condition, to obtain a desired powder with a solution method, since each material has a specific solubility for a specific solution.

Since the reaction temperature is between 180 and 230 □ in the present invention, Zinc oxide (Yakuri Co., Purity 99%) and Zinc acetate (dehydrate, Aldrich Co., Purity 99.99%) having relatively low solubility are used.

As a Sulfur source, $Na_2S$, $Na_2S_2O_3$, thioacetamide ($CH_3CSNH_2$; hereinafter referred to TAA) and thiourea ($NH_2CSNH_2$; hereinafter referred to TU) may be used for the synthesis in solution. However, said $Na_2S$, etc. are rapidly discomposed to $H_2S$ or $HS^-$, thus the reaction represented by Formula 1 is performed at the same time of mixing these materials. Thereby, the supersaturation phase is not maintained so that the crystal is not fully grown. On other hand, TAA and TU are relatively slowly discomposed at around 100 □. The initial nucleogenesis is less generated and it is decomposed at a higher temperature, so that $Zn^{2+}$ and $S^{2-}$ may be consumed upon growing the crystal. Accordingly, TAA (Junsei Co.; Purity 97%) and TU(Aldrich Co.; Purity—more than 99%) are preferably adopted as a main Sulfur source.

If the soluble is not continuously supplied to the reaction, the concentration of the reacting solute is generally maintained to the regular level and promptly reduced from the time of generating a reacting product. The maintaining duration is varied and the crystalinity degree is determined depending on the amount of reactant material. That is, if the amount of material is insufficient to accomplish the full crystal growth after the nucleogenesis, the further crystal growth is not performed by decreasing the concentration of solute. While, when the concentration is too high, the duration for consuming all materials is excessively prolonged and the size distribution of particulate becomes broadened due to the irregular nucleogenesis, since the crystal growth rate is remarkable reduced since the acceleration of crystal growth is decreased upon growing the reactant product. Accordingly, the appropriate amount of material is important to control the sized of particulate.

The above-mentioned hydrothermal reaction of the present invention is preferably carried out by charging Zn source and S source with the concentration range of 0.28–3 mol/l and 0.42–4 M respectively, under the condition of the mixed concentration ratio of Zn source:S source is from 1:1 to 1:3. More specifically, Zn source is charged for the reaction with the concentration range of 0.02 mol to 0.12 mol in 50–70 ml of water and S source is charged with the concentration range of 0.03 mol to 0.15 mol. Among these concentration ranges, it is particularly preferable that the concentration of the reaction material (based on Zn source) is approximately 0.08 mol.

It has been found that the above-mentioned hydrothermal reaction of the present invention is preferably carried out by charging the reactants with the concentration as described above and by performing reaction under the condition of reaction temperature of 180 to 230° C. and reaction time of 3 to 60 hours, particularly the reaction time of 12 hours being most economical.

Though the main purpose of using additives is to control the solubility of reaction solutions, additives can also be used either to control surface energy of reaction products enabling promotion the growth of specific crystal surface, or to be adsorbed on a specific crystal surface and to interfere the growth of the surface thereby functioning to control the shape of the particles. Adjusting pH of the reaction solutions is very important in controlling the degree of supersaturation because the pH is directly related to solubility of raw materials. For the reaction additives according to the present invention, 1N $H_2SO_4$ aqueous solution (Duksan Co.), acetic acid (Duksan Co., purity 99%), and 1N nitric acid aqueous solution (Duksan Co.) are used as a first additive, while NaCl (Aldrich Co., purity 99% or more) and NaI (Yakuri Co., purity 99.5%) are used as a second additive. Among the above additives, the acidic solution of the first additive is used mainly for the purpose of changing solubility, while NaCl and NaI are used for the purpose of controlling crystal growth.

In consideration of the effect of sulfur, it can be found that when the amount of sulfuric acid solution (1N) is changed in the range of 0–70 ml, overall growth of particle and crystallinity increase up to 20 ml whereas the growth of particle is hindered in case of using more than 20 ml of it. In other words, it is found that in case of more than 20 ml of sulfuric acid solution excess amount of nuclear is formed due to large amount of Zn source is dissolved or growth rate of ZnS is reduced due to high concentration of sulfuric acid. Therefore, it is preferable that sulfuric aicd is added with the maximum concentration of 0.2 mol/l.

In case of nitric acid (1N), it can be seen that the effect of sulfuric acid appears at a lower concentration in that the particle size decreases by adding as small amount as 10 ml. In this case, however, homogeneity of particle is further improved. Therefore, it is preferable that nitric acid is added with the concentration of maximum 0.4 mol/l.

In case of acetic acid, though the effect of concentration upon the growth of particle is significantly small in view of using high concentration of raw materials, there appeared an effect of reducing the particle size in general. Therefore, it is preferable that acetic acid is added with the concentration of maximum of 6.92 mol/l.

Both NaCl and NaI reveal an effect of improving homogeneity of particle size in the growth of particle, and a desirable result is obtained by using an amount of 0 to 2 g with respect of 50 to 70 ml of distilled water. Therefore, it is preferable that NaCl and NaI as second additives are added with maximum concentration of 0.68 mol/l and 0.26 mol/l respectively.

As described above, since the Zinc Sulfide (ZnS) powder has high crystallinity and low surface energy, when fluorescent material is produced using the ZnS powder produced by the method in accordance with the present invention, a particle of raw material is grown to be a fluorescent particle while the growth between particles are limited, thus enabling the production of fluorescent material is enable with easy control of the particle size and its shape.

The present invention will be explained in more detail to the following Examples. However these are to illustrate the present invention and the present invention is not limited to them.

EXAMPLE

The general process for preparing ceramic powder using hydrothermal synthesis comprises a step of mixing and dispersing sources, a step of hydrothermal reaction in resisting pressure apparatus, a step of washing, and a step of drying.

The autoclave of Examples that is a resisting pressure apparatus, used Teflon liner, and their stirrer was a magnetic bar. The FIG. 1 is illustrated to the approximate figure of the autoclave.

The washing for reaction product used a hot distilled water and ethyl alcohol, and after washing the produce was dried for more than 5 hours in dry oven. The dried powder was watched by an electric microscope.

Example 1

0.02 mol of Zinc oxide and 0.03 mol of thioacetamide (TAA) were dispersed and dissolved in 50 ml of distilled water, 20 ml of 1 N $H_2SO_4$ as an additive was added, and hydrothermal reaction was conducted at 180° C. for 24 hours.

Figure 2:
FIG. 2 is a SEM photograph of ZnS powder in Example 1.

The result was that ZnS particles having a particle size of 0.2 to 0.5 μm were produced. The shape of particle is illustrated by 8000 times magnified SEM photo in FIG. 2. Herein the length of scale bar shows 2 μm.

Example 2

0.02 mol of Zinc oxide and 0.03 mol of thioacetamide (TAA) were dispersed and dissolved in 50 ml of distilled water, 20 ml of 1 N H$_2$SO$_4$ as an additive was added, and hydrothermal reaction was conducted at 200° C. for 12 hours.

Figure 3:
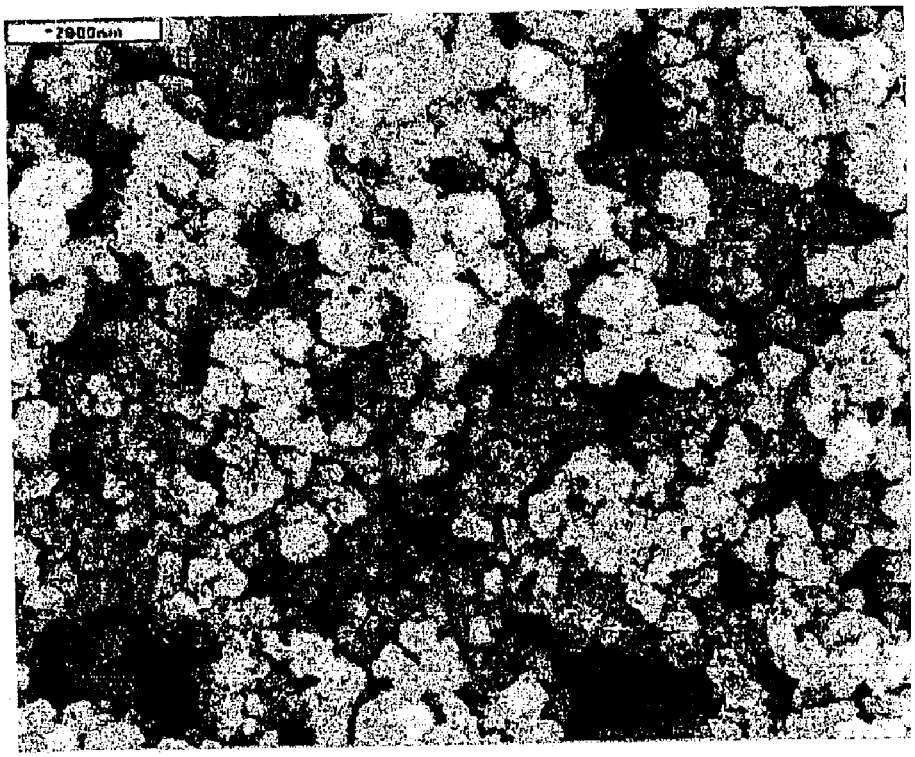
FIG. 3 is a SEM photograph of ZnS powder in Example 2.

The resulted was that ZnS particles having a particle size of 0.3 to 0.8 μm were produced. The shape of particle is illustrated by 10000 times magnified SEM photo in FIG. 3. Herein the length of scale bar shows 2 μm.

Example 3

0.02 mol of Zinc oxide and 0.03 mol of thioacetamide (TAA) were dispersed and dissolved in 50 ml of distilled water, 20 ml of 1 N H$_2$SO$_4$ as an additive was added, and hydrothermal reaction was conducted at 230° C. for 12 hours.

Figure 4:
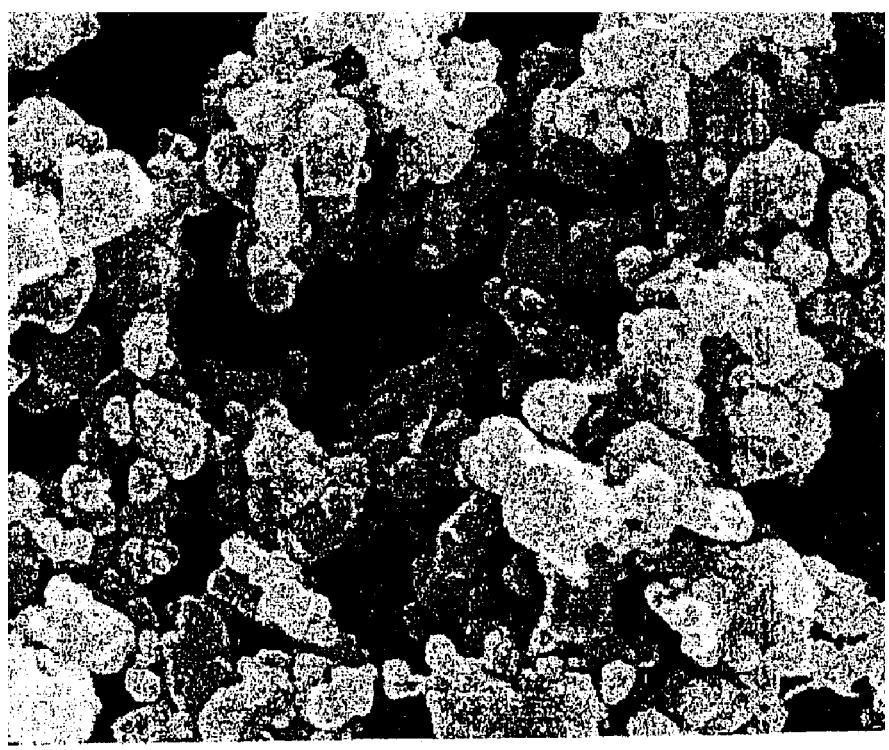
FIG. 4 is a SEM photograph of ZnS powder in Example 3.

The result was that particles having a particle size of 0.5 to 1.5 μm were produced. The shape of particle is illustrated by 8000 times magnified SEM photo in FIG. 4.

The above Examples 1 to 3 show that an increase of the temperature makes an increase of particle size.

Example 4

0.08 mol of Zinc oxide and 0.12 mol of thioacetamide (TAA) were dispersed and dissolved in 45 ml of distilled water, 5 ml of 1 N H$_2$SO$_4$ as an additive was added, and hydrothermal reaction was conducted at 230° C. for 12 hours.

Figure 5:
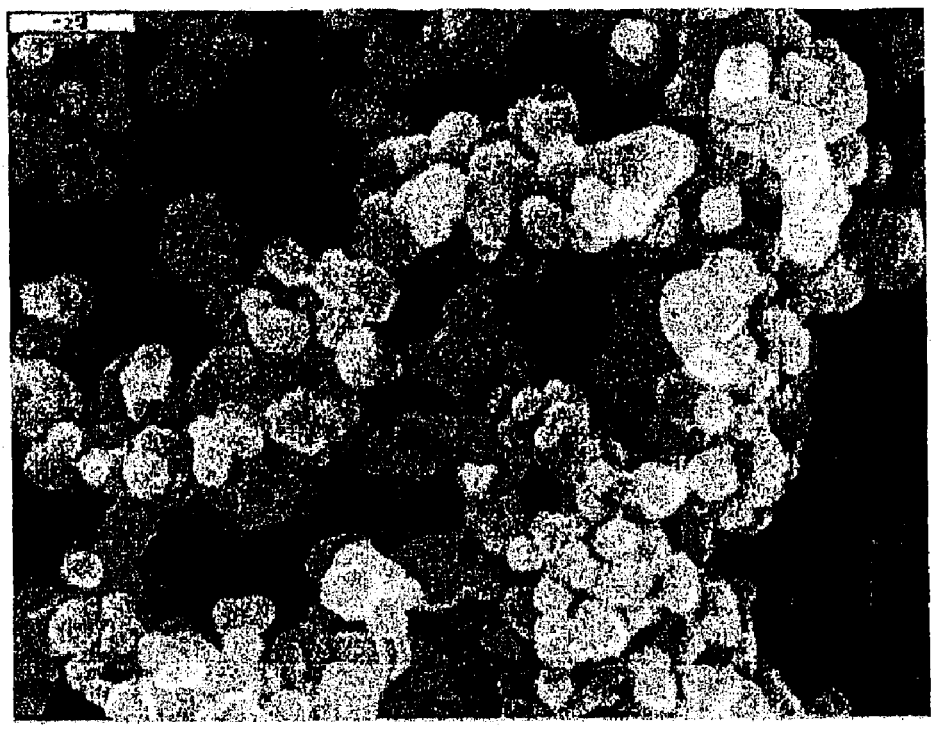
FIG. 5 is a SEM photograph of ZnS powder in Example 4.

The result was that particles having a particle size of 0.8 to 1.5 μm were produced. The shape of particle is illustrated by 8000 times magnified SEM photo in FIG. 5. Herein the length of scale bar shows 2 μm.

Example 5

0.12 mol of Zinc oxide and 0.18 mol of thioacetamide (TAA) were dispersed and dissolved in 40 ml of distilled water, 10 m of 1 N H$_2$SO$_4$ as an additive was added, and hydrothermal reaction was conducted at 230° C. for 12 hours.

Figure 6:
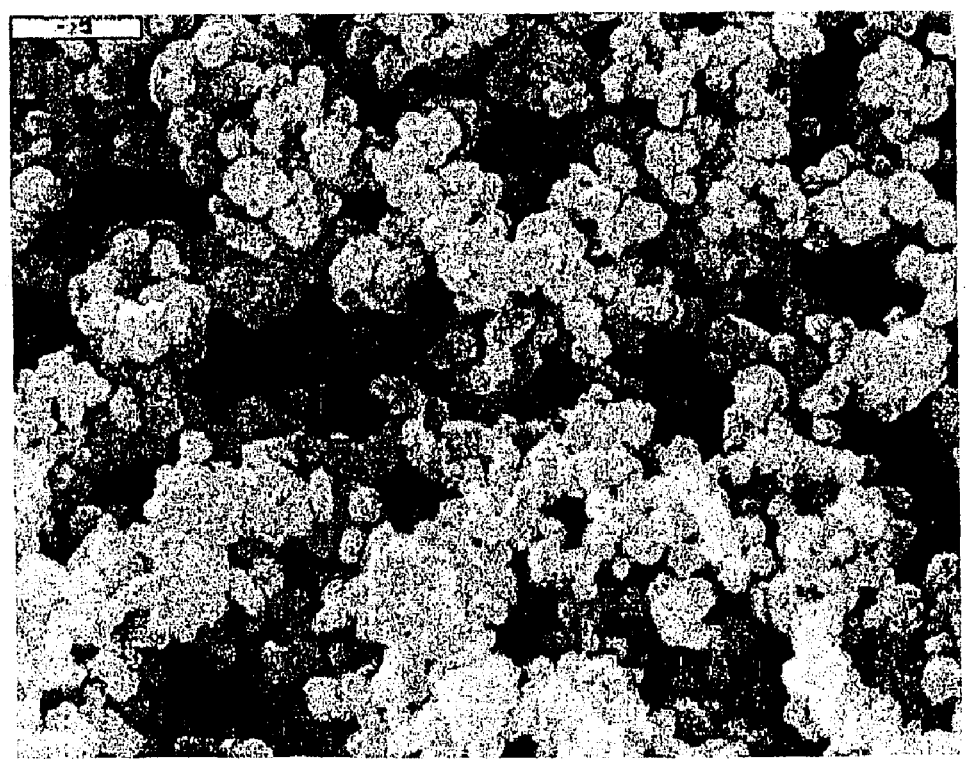
FIG. 6 is a SEM photograph of ZnS powder in Example 5.

The result was that particles having a particle size of 0.3 to 0.8 μm were produced. The shape of particle is illustrated by 8000 times magnified SEM photo in FIG. 6. Herein the length of scale bar shows 2 μm.

Example 6

0.08 mol of Zinc oxide and 0.12 mol of thioacetamide (TAA) were dispersed and dissolved in 40 ml of distilled water, 10 ml of 1 N H$_2$SO$_4$ and 1 g of NaCl as an additive were added, and hydrothermal reaction was conducted at 230° C. for 12 hours.

Figure 7:
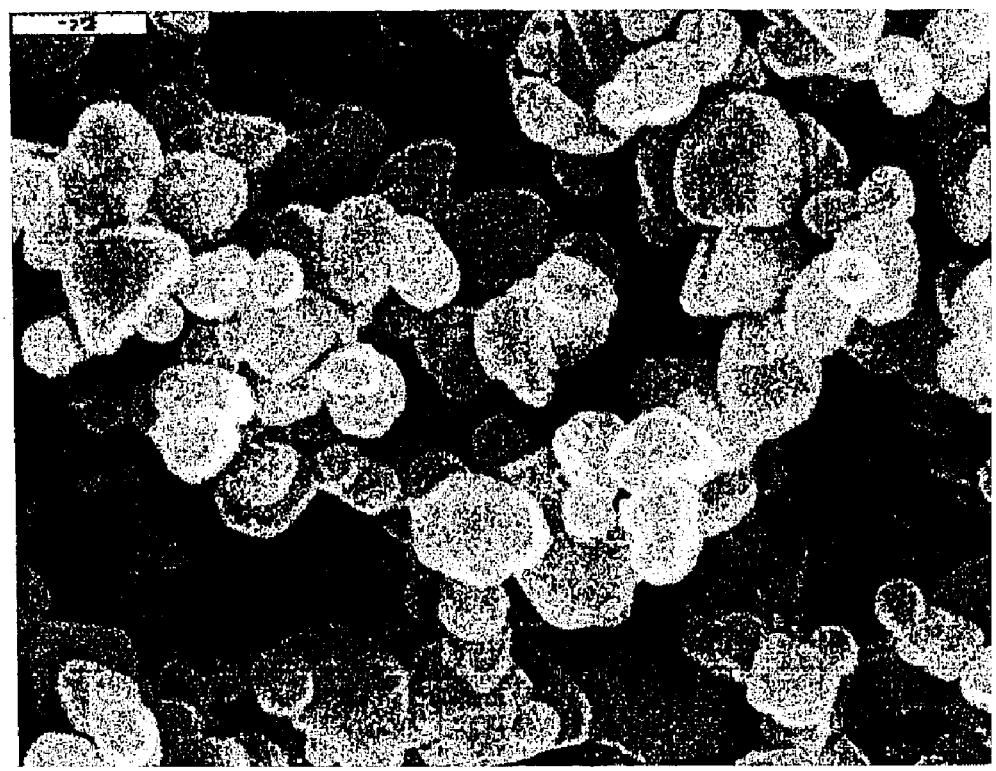
FIG. 7 is a SEM photograph of ZnS powder in Example 6.

The result was that particles having a particle size of 1 to 2 μm were produced. The shape of particle is illustrated by 8000 times magnified SEM photo in FIG. 7. Herein the length of scale bar shows 2 μm.

Example 7

0.08 mol of Zinc oxide and 0.12 mol of thioacetamide (TAA) were dispersed and dissolved in 40 ml of distilled water, 10 ml of 1 N H$_2$SO$_4$ and 1 g of NaI as an additive were added, and hydrothermal reaction was conducted at 230° C. for 12 hours.

Figure 8:
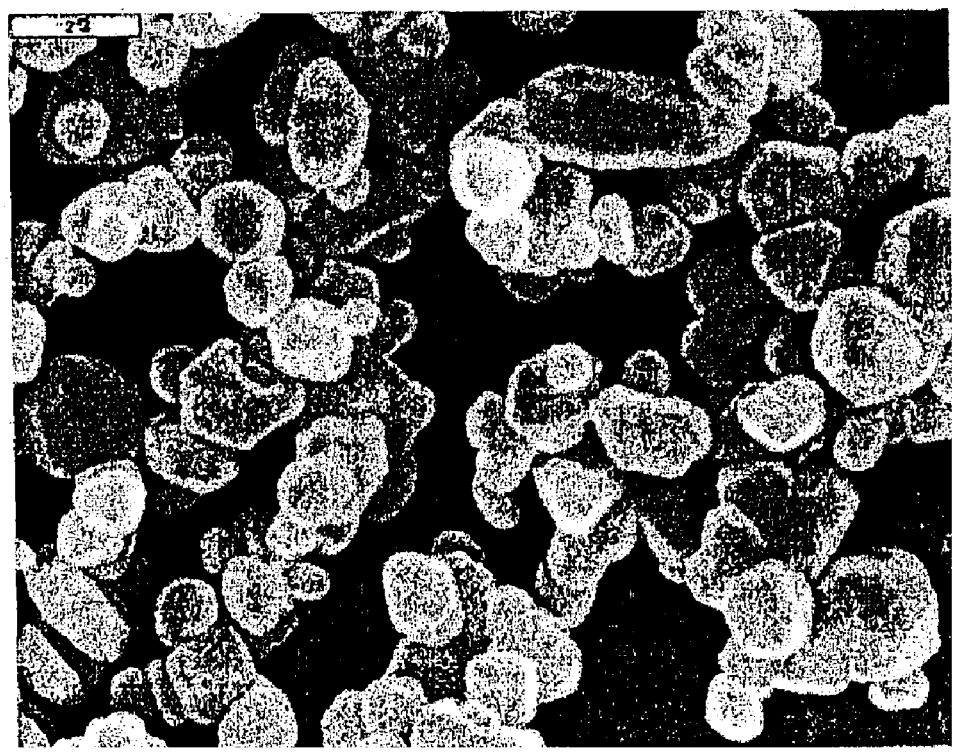
FIG. 8 is a SEM photograph of ZnS powder in Example 7.

The result was that particles having a particle size of 1 of 2 μm were produced. The shape of particle is illustrated by 8000 times magnified SEM photo in FIG. 8. Herein the length of scale bar shows 2 μm.

Example 8

0.08 mol of Zinc oxide and 0.12 mol of thioacetamide (TAA) were dispersed and dissolved in 40 ml of distilled water, 10 ml of 1 N HNO$_3$ as an additive was added, and hydrothermal reaction was conducted at 230° C. for 12 hours.

Figure 9:
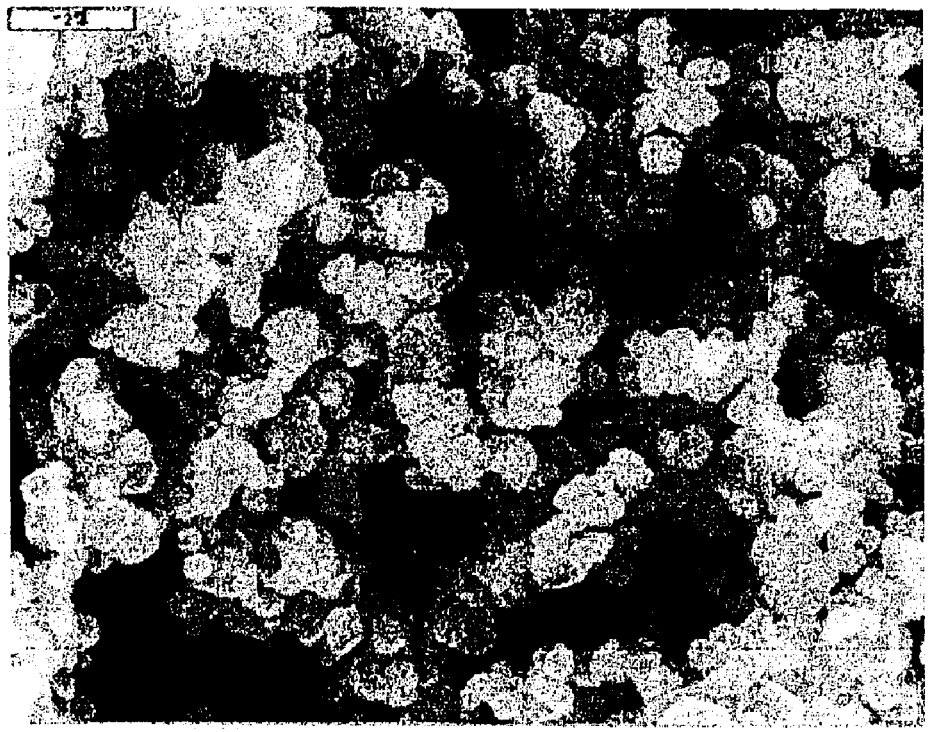
FIG. 9 is a SEM photograph of ZnS powder in Example 8.

The result was that particles having a particle size of 0.5 to 1 μm were produced. The shape of particle is illustrated by 8000 times magnified SEM photo in FIG. 9. Herein the length of scale bar shows 2 μm.

Example 9

0.08 mol of Zinc oxide and 0.12 mol of thioacetamide (TAA) were dispersed and dissolved in 30 ml of distilled water, 20 ml of 1 N HNO$_3$ as an additive was added, and hydrothermal reaction was conducted at 230° C. for 12 hours.

Figure 10:
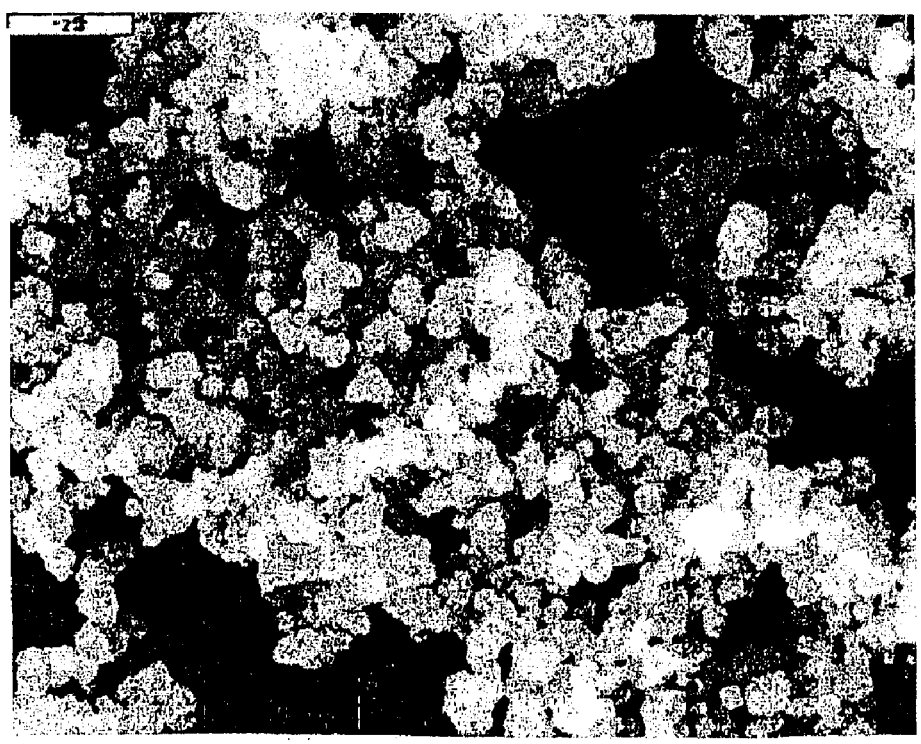
FIG. 10 is a SEM photograph of ZnS powder in Example 9.

The result was that particles having a particle size of 0.3 to 0.5 μm were produced. The shape of particle is illustrated by 8000 times magnified SEM photo in FIG. 10. Herein the length of scale bar shows 2 μm.

The particle size is decreased according to increasing nitric acid in comparison of the above Examples 8.

Example 10

0.08 mol of Zinc oxide and 0.12 mol of thioacetamide (TAA) were dispersed and dissolved in 50 m of distilled water, 10 ml of acetic acid(100%) as an additive was added, and hydrothermal reaction was conducted at 230° C. for 12 hours.

Figure 11:
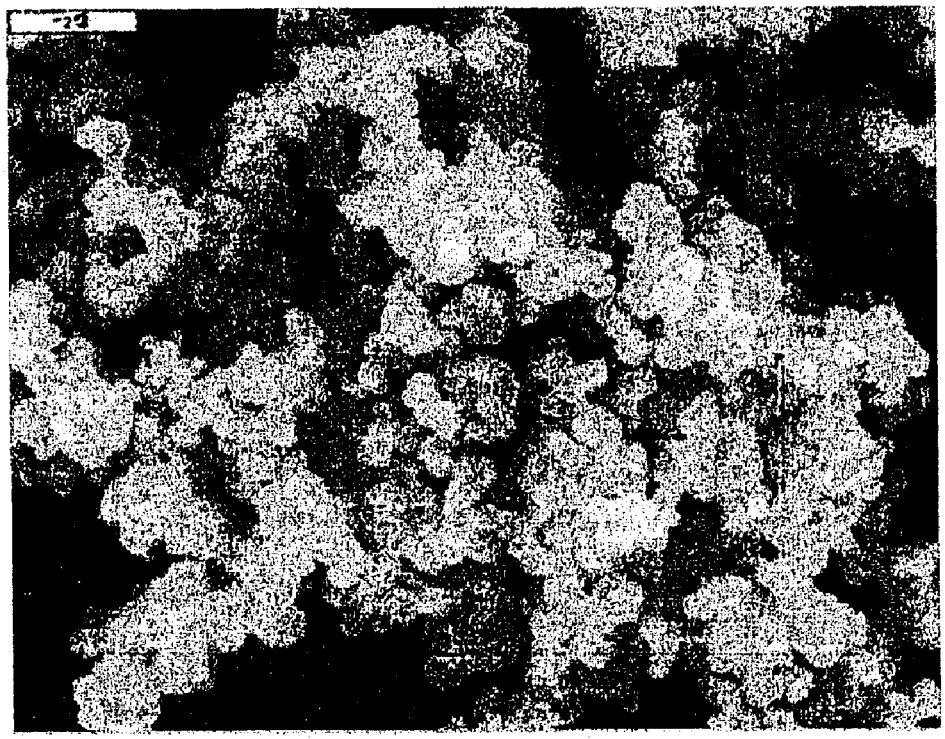
FIG. 11 is a SEM photograph of ZnS powder in Example 10.

The result was that particles having a particle size of 0.5 to 1.5 μm were produced. The shape of particle is illustrated by 8000 times magnified SEM photo in FIG. 11. Herein the length of scale bar shows 2 μm.

Example 11

0.08 mol of Zinc oxide and 0.12 mol of thiourea (TU) were dispersed and dissolved in 50 m of distilled water without an additive, and hydrothermal reaction was conducted at 230° C. for 12 hours.

Figure 12:
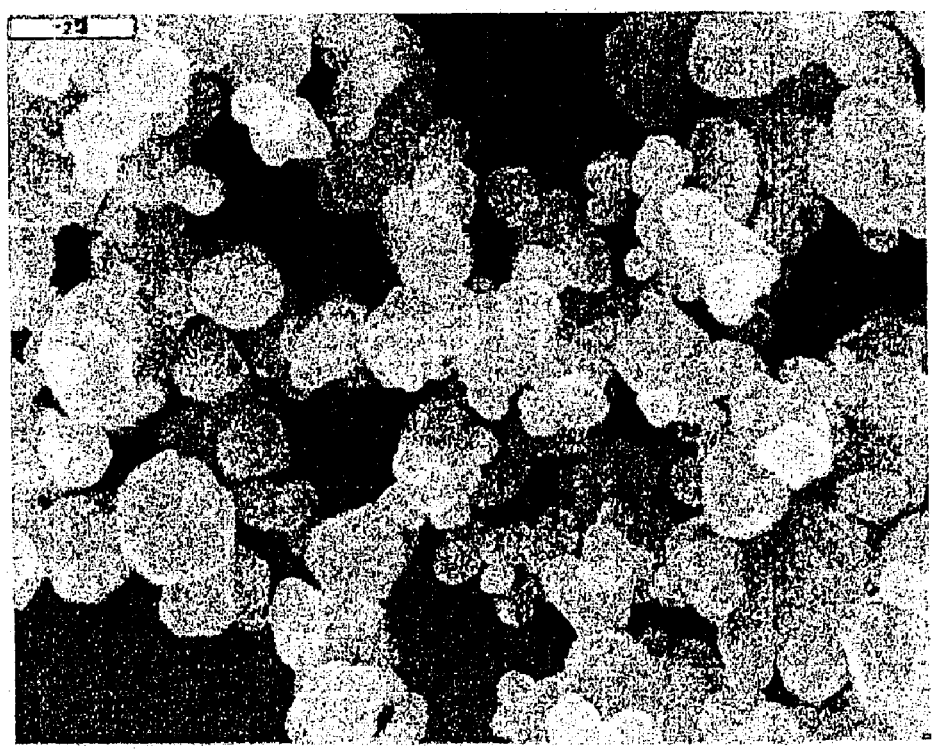
FIG. 12 is a SEM photograph of ZnS powder in Example 11.

The result was that particles having a particle size of 1 to 2 μm were produced. The shape of particle is illustrated by 8000 times magnified SEM photo in FIG. 12. Herein the length of scale bar shows 2 μm.

Example 12

0.08 mol of Zinc oxide and 0.12 mol of thiourea (TU) were dispersed and dissolved in 50 ml of distilled water, 10 ml of 1 N acetic acid as an additive was added, and hydrothermal reaction was conducted at 230° C. for 12 hours.

Figure 13:
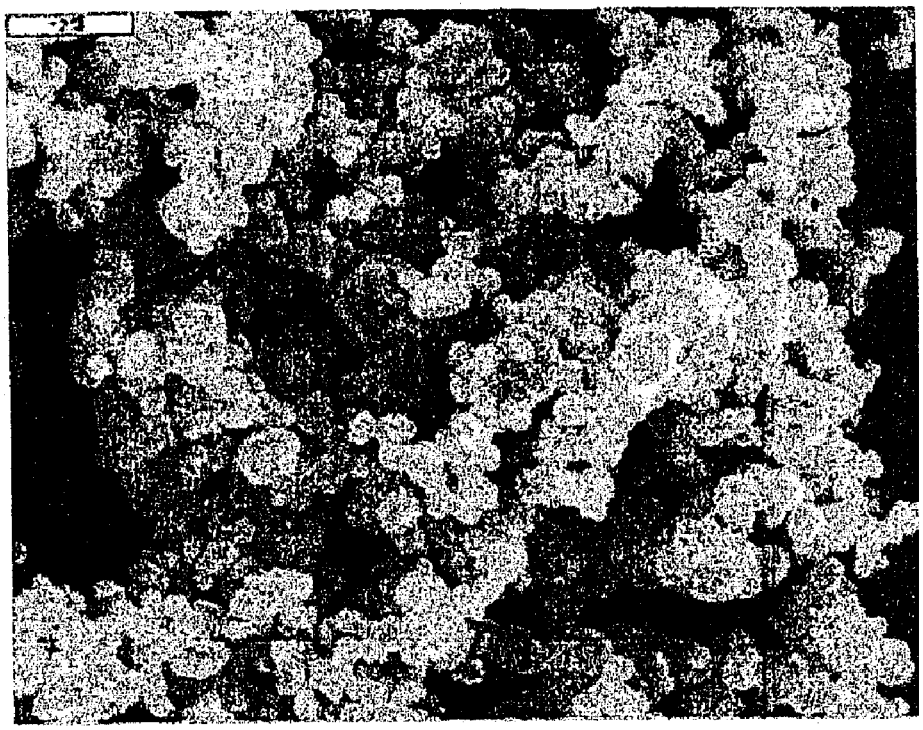
FIG. 13 is a SEM photograph of ZnS powder in Example 12.

The result was that particles having a particle size of 0.5 to 1.5 μm were produced. The shape of particle is illustrated by 8000 times magnified SEM photo in FIG. 13. Herein the length of scale bar shows 2 μm.

Example 13

0.08 mol of Zinc oxide and 0.12 mol of thiourea (TU) were dispersed and dissolved in 40 m of distilled water, 10 mof 1 N HNO$_3$ as an additive was added, and hydrothermal reaction was conducted at 230° C. for 12 hours.

Figure 14:
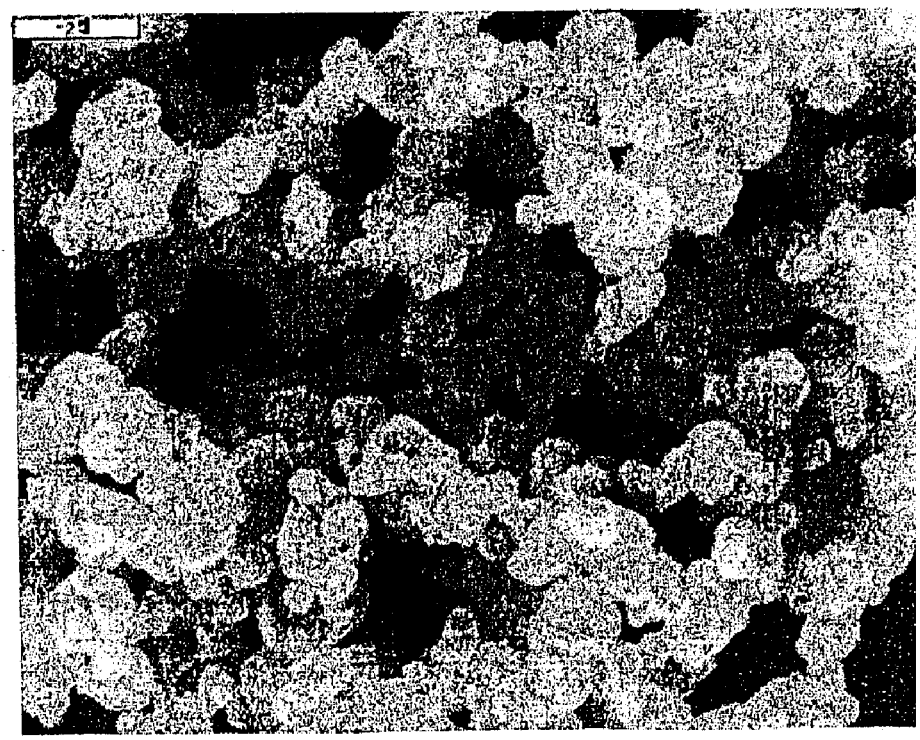
FIG. 14 is a SEM photograph of ZnS powder in Example 13.

The result was that particles having a particle size of 0.5 to 1.5 μm were produced. The shape of particle is illustrated by 8000 times magnified SEM photo in FIG. 14. Herein the length of scale bar shows 2 μm.

Example 14

0.08 mol of Zinc acetate and 0.12 mol of thiourea (TU) were dispersed and dissolved in 50 ml of distilled water without an additive, and hydrothermal reaction was conducted at 230° C. for 12 hours.

Figure 15:
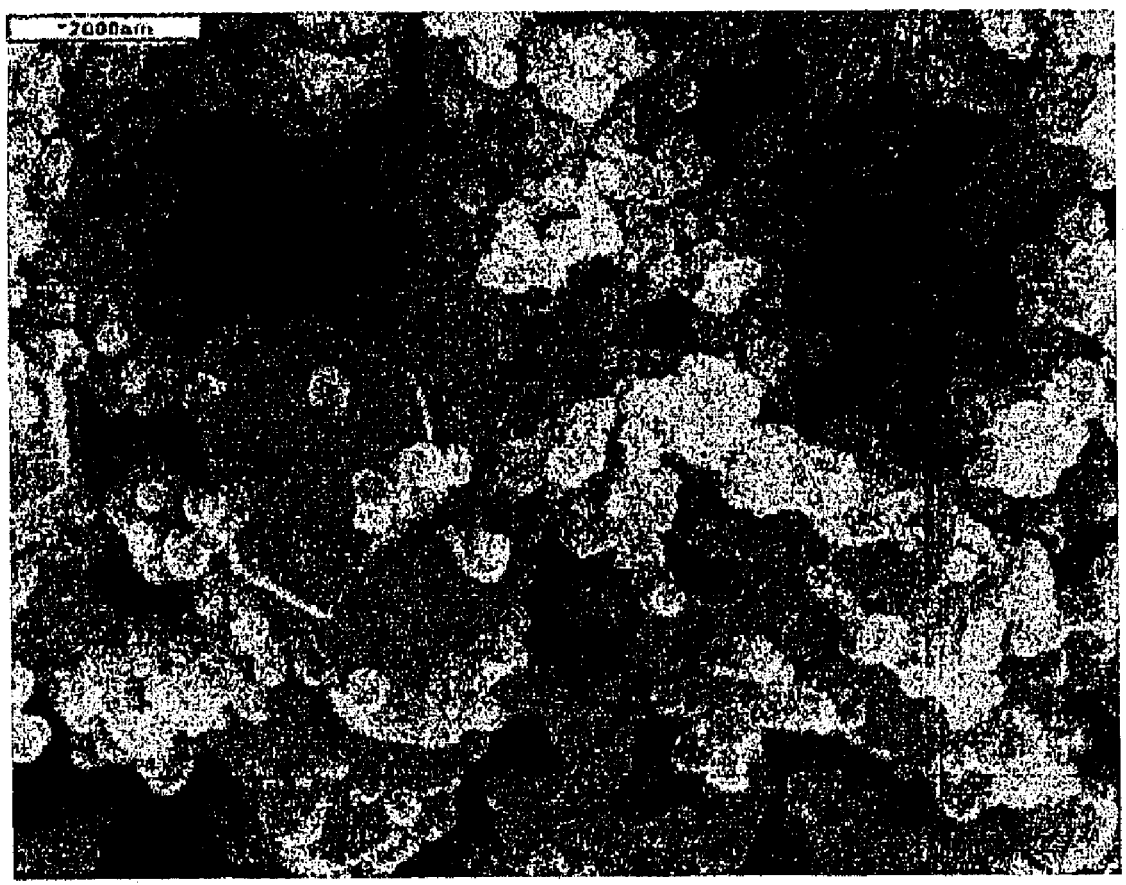
FIG. 15 is a SEM photograph of ZnS powder in Example 14.

The result was that particles having a particle size of 0.3 to 0.8 μm, and particles having a particle size of over 2 μm were observed. The shape of particle is illustrated by 10000 times magnified SEM photo in FIG. 15. Herein the length of scale bar shows 2 μm.

Example 15

0.08 mol of Zinc acetate and 0.12 mol of thioacetamide (TAA) were dispersed and dissolved in 50 ml of distilled water without an additive, and hydrothermal reaction was conducted at 230° C. for 12 hours.

Figure 16:
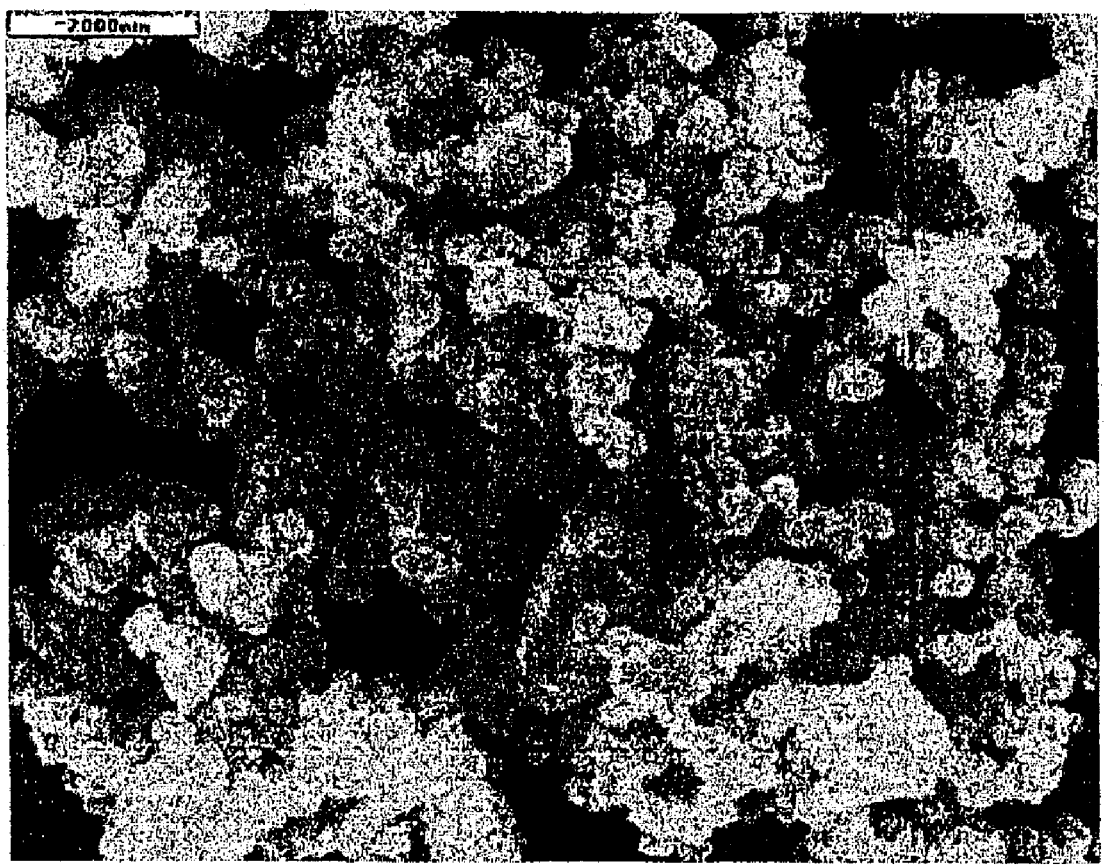
FIG. 16 is a SEM photograph of ZnS powder in Example 15.

The result was that particles having a particle size of 0.3 to 0.8 μm, and particles having a large particle size were observed. The shape of particle is illustrated by 10000 times magnified SEM photo in FIG. 16. Herein the length of scale bar shows 2 μm.

Example 16

0.08 mol of Zinc acetate and 0.12 mol of thioacetamide (TAA) were dispersed and dissolved in 50 ml of distilled water, 10 m of 1 N $HNO_3$ as an additive was added, and hydrothermal reaction was conducted at 230° C. for 12 hours.

Figure 17:
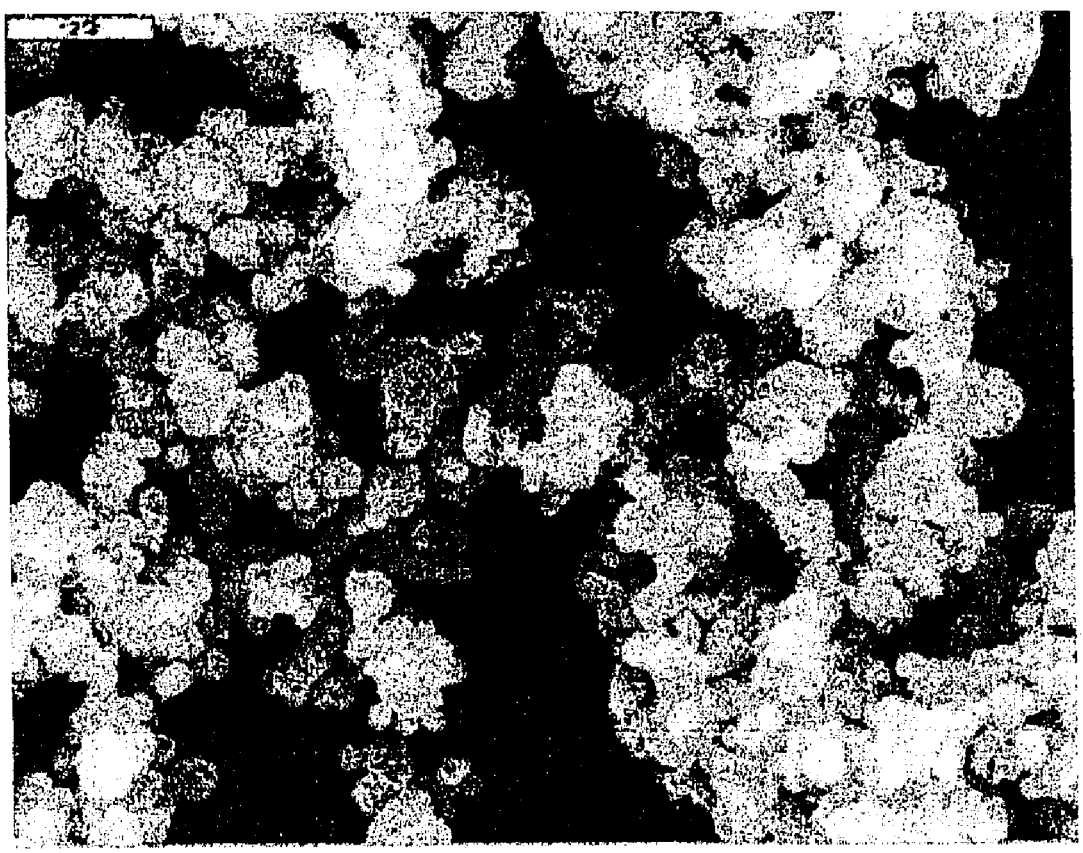
FIG. 17 is a SEM photograph of ZnS powder in Example 16.

The result was that particles having a particle size of 0.3 to 0.5 μm, and particles having a particle size of 1 μm above were observed. The shape of particle is illustrated by 8000 times magnified SEM photo in FIG. 17. Herein the length of scale bar shows 2 μm.

Comparative Example 1

0.02 mol of Zinc oxide and 0.03 mol of $Na_2S$ were dispersed and dissolved in 50 m of distilled water, and hydrothermal reaction was conducted at 230° C. for 24 hours.

Figure 19:
FIG. 19 is a SEM photograph of ZnS powder in Comparative Example 1.

The result was that an aggregate of ZnS having a nano-sized particle was produced. The shape of particle is illustrated by 8000 times magnified SEM photo in FIG. 19. Herein the length of scale bar shows 2 μm.

Comparative Example 2

0.02 mol of Zinc oxide and 0.03 mol of thiourea (TU) were dispersed and dissolved in 50 m of distilled water, 10 m of 1 N $H_2SO_4$ as an additive was added, and hydrothermal reaction was conducted at 150° C. for 12 hours.

Figure 20:
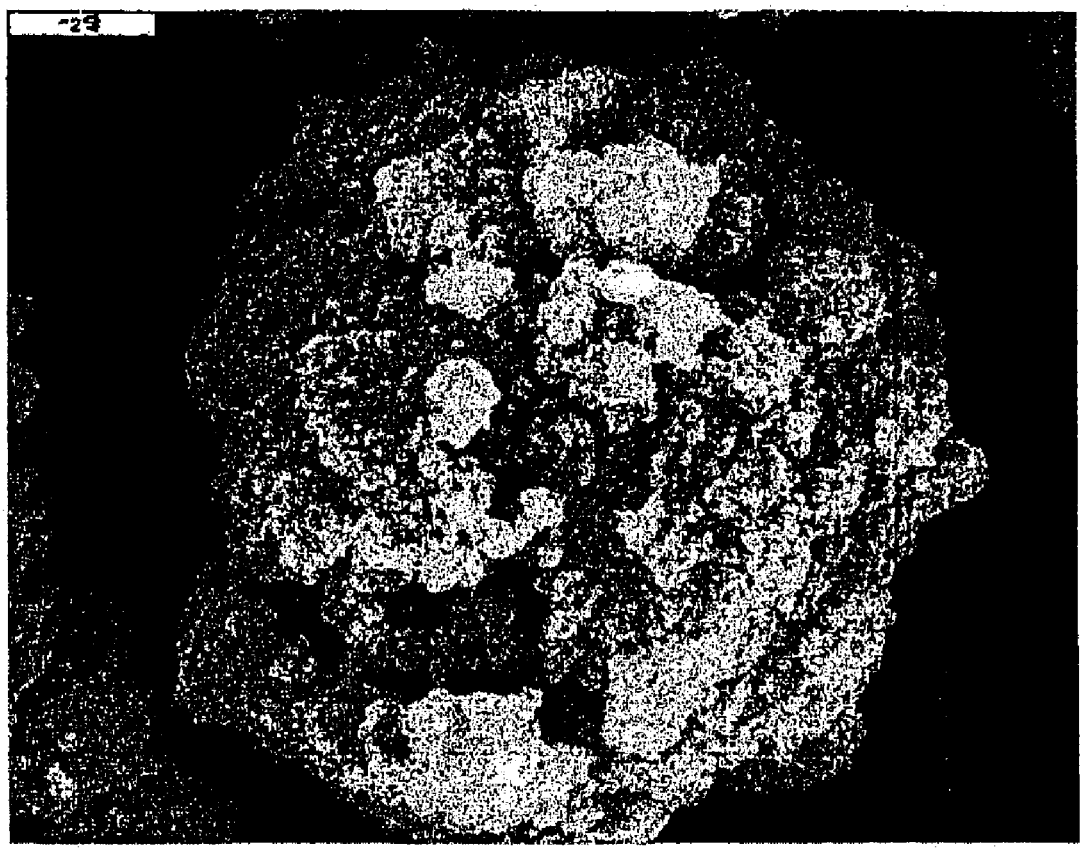
FIG. 20 is a SEM photograph of ZnS powder in Comparative Example 2.

The result was that a large aggregate having a nano-sized particle was produced. The shape of particle is illustrated by 8000 times magnified SEM photo in FIG. 20. Herein the length of scale bar shows 2 μm.

Comparative Example 3

0.08 mol of Zinc acetate and 0.12 mol of TAA were dispersed and dissolved in 50 m of distilled water, 20 m of 1 N $H_2SO_4$ as an additive was added, and hydrothermal reaction was conducted at 250° C. for 12 hours.

Figure 21:
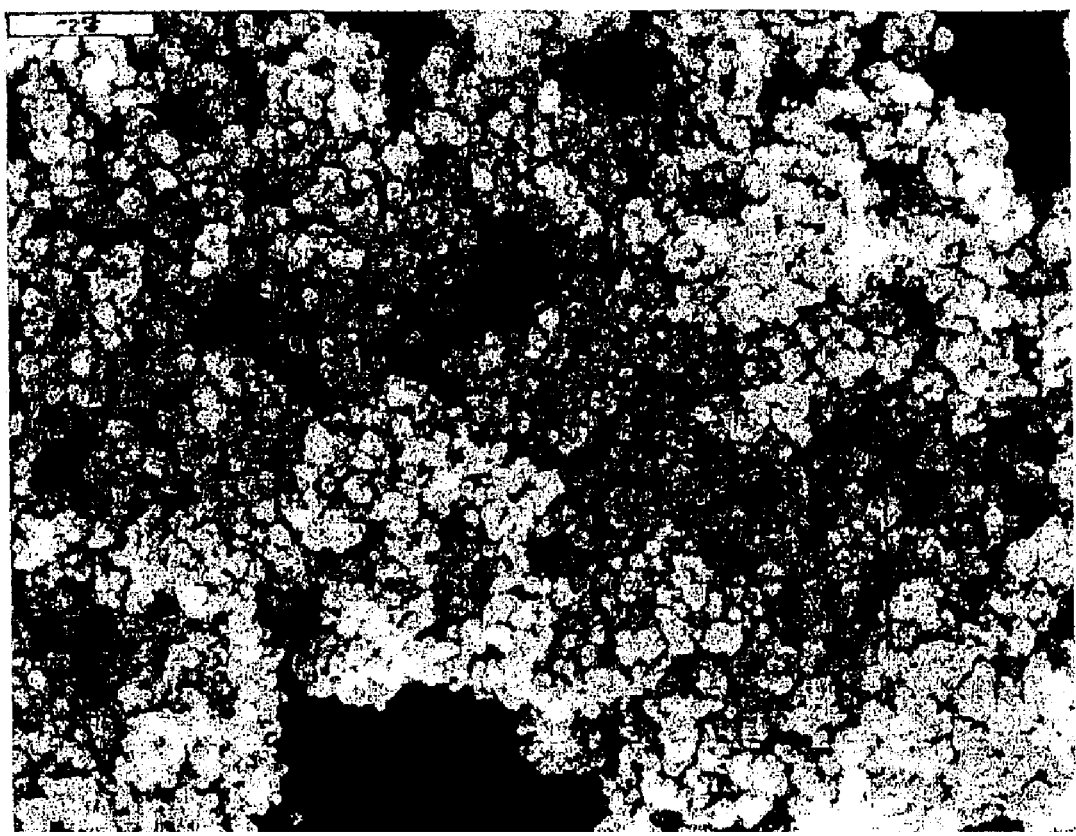
FIG. 21 is a SEM photograph of ZnS powder in Comparative Example 3.

The result was that particles having a particle size of 0.2 μm below, and the particles were aggregated extremely. The shape of particle is illustrated by 8000 times magnified SEM photo in FIG. 21. Herein the length of scale bar shows 2 μm.

Example 17

Preparation of green luminous fluorescence body using ZnS)

Slurry was prepared by mixing 200 g of ZnS powder prepared from Example 7 with distilled water. 4.15 g of 0.1 M $CuSO_4 5H_2O$ and 7.34 g of 0.1 M $AlCl_3 6H_2O$ were added and mixed to the slurry.

The slurry was dried, the dried slurry was filtered by sieve of 500 mesh, and after the sieve-passed powder was added to crucible with sulfur and an active carbon, the green luminous fluorescence was prepared by sintering the mixture at a temperature of 900 □ for 2 hours under nitrogen gas environment.

Figure 18:
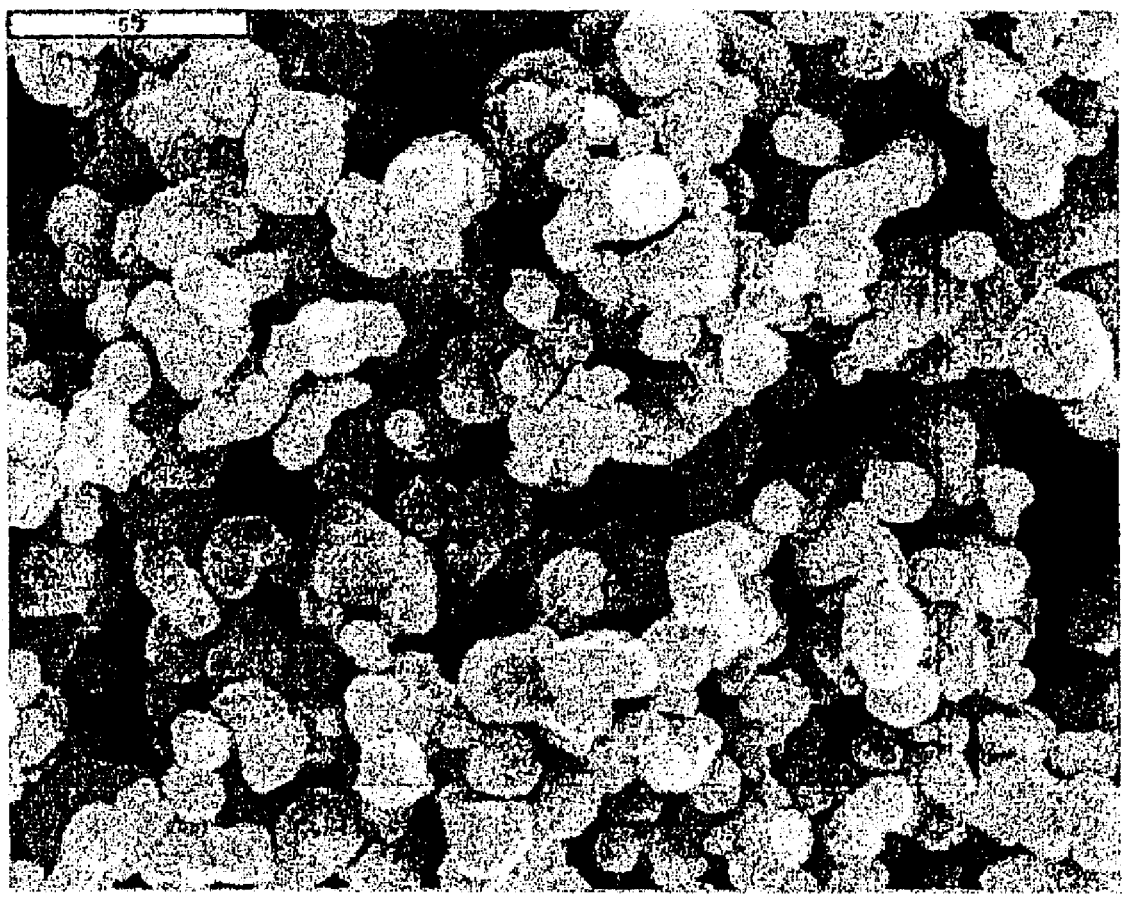
FIG. 18 is a SEM photograph of ZnS powder based green luminous fluorescent powder in Example 17.

The shape of the green luminous fluorescence is illustrated by 5000 times magnified SEM photo in FIG. 18. Herein the length of scale bar shows 2 μm.

The result shows that the particle size and the shape of the green luminous fluorescence is similar to ZnS powder as a source.

The green luminous fluorescence made by this invention method is not limited to the above Example 17. Accordingly they can be prepared by selecting various sources and methods.

The preparation method of this invention can easily prepare Zinc Sulfide powder having controlled particle size of 5 um below and shape, and can easily prepare fluorescent substance controlled particle size and shape because the particle size and the shape of synthetic fluorescent substance is similar to them of source powders if the fluorescent substance is prepared by using a Zinc Sulfide powder having controlled particle size and shape.

What is claimed is:

1. A method for preparing a single crystalline powder of Zinc Sulfide (ZnS) having a high crystallinity comprising a step of conducting a hydrothermal reaction of a) Zinc Oxide or Zinc acetate as Zinc source and b) thioacetamide or thiourea as Sulfur source at a temperature of 180 to 230° C.

2. The method for preparing a single crystalline powder of Zinc Sulfide (ZnS) according to Claim 1, wherein the hydrothermal reaction is conducted by adding the first additive selected from a group of sulfuric acid, nitric acid, and acetic acid.

3. The method for preparing a single crystalline powder of Zinc Sulfide (ZnS) according to Claim 1, wherein the hydrothermal reaction is conducted by adding the first additive selected from a group of sulfuric acid, nitric acid, and acetic acid and the second additive selected from a group of sodium chloride and sodium iodide.

4. The method for preparing a single crystalline powder of Zinc Sulfide (ZnS) according to Claim 3, wherein the maximum concentration of sodium chloride is 0.68 mol/l, and the maximum concentration of sodium iodied is 0.26 mol/l.

5. The method for preparing a single crystalline powder of Zinc Sulfide (ZnS) according to Claim 2, wherein the maximum concentration of the sulfuric acid is 0.2 mol/l, the maximum concentration of nitric acid is 0.4 mol/l, and the maximum concentration of acetic acid is 6.92 mol/l.

6. The method for preparing a single crystalline powder of Zinc Sulfide (ZnS) according to Claim 1, wherein the mix-concentration ratio of zinc source and sulfur source is 1 : 1~3, the concentration of the zinc source is 0.28 to 3 mol/l, and the concentration of the sulfur source is 0.42 to 4 M.

7. The method for preparing a single crystalline powder of Zinc Sulfide (ZnS) according to Claim 1, wherein the hydrothermal reaction is conducted for 3 to 60 hours.

* * * * *